Figure 1:
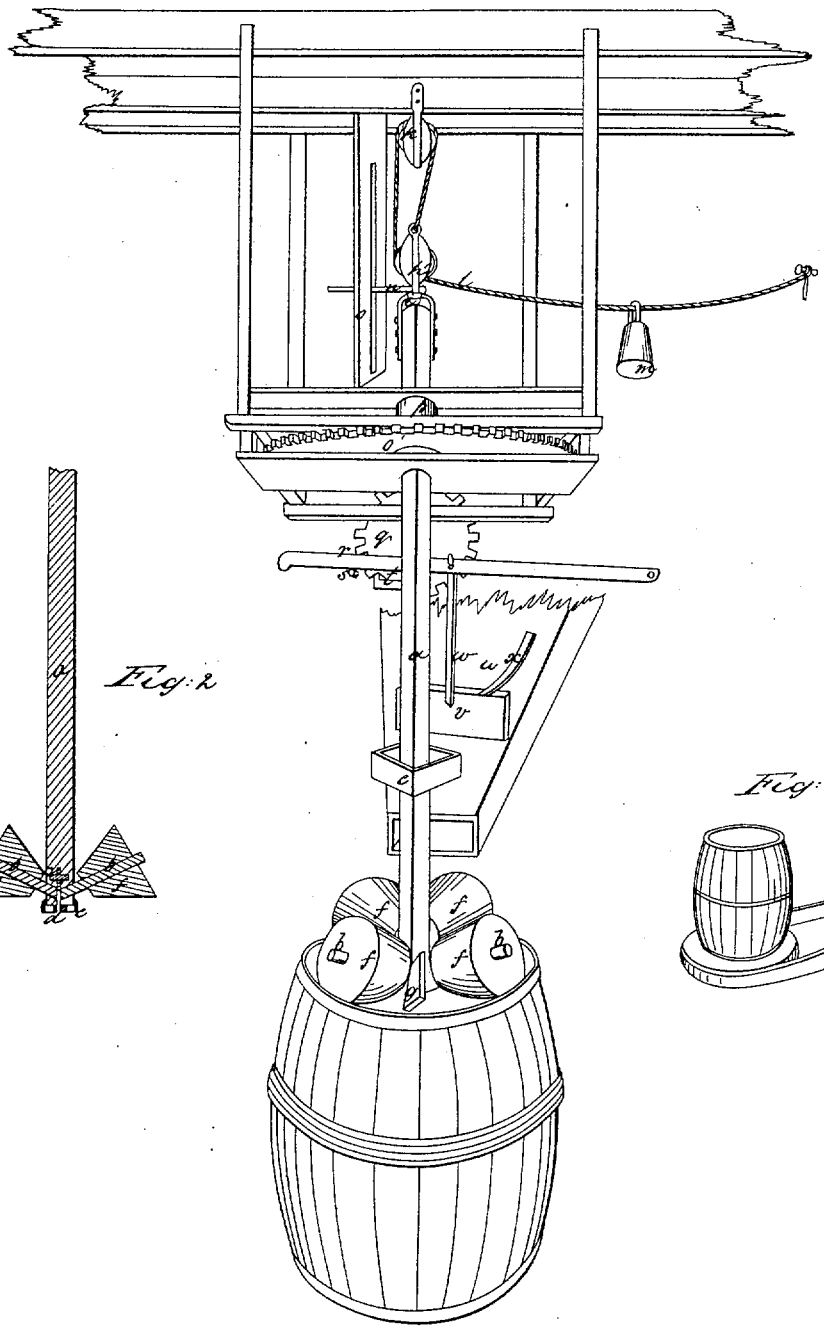
Figure 2:
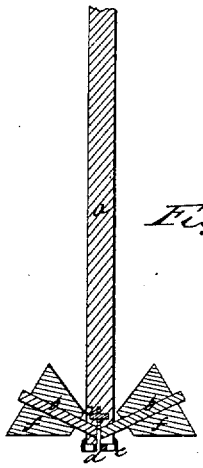
Figure 3:
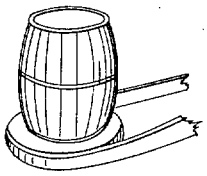

No Printed Specification Available

8665X

J. Kinman,

Flour Packer.

Patented Mar. 2, 1835.

AM. PHOTO-LITHO. CO. N.Y. (OSBORNE'S PROCESS)

John Kinman of the Township of Hartley Pennsylvania

Letters Patent.

The schedule referred to in these Letters Patent and making part of the same containing, a description in the words of the said John Kinman himself of his improvement in the packing of Flour in casks or Barrels, To all to whom these presents shall come, Be it known that I John Kinman of the Township of Hartley in the County of Union and State of Pennsylvania, have invented a new and useful Machine and improvement in packing flour in barrels and that the following is a full and exact description of the construction and operation thereof —

The machine is composed of the following parts and pieces viz — First a shaft seven feet long (or whatever length may suit best, best to answer the works of the mill, to put it in Motion) three inches square, In the lower end of this shaft are four spindles or axles of hickory or other solid wood turned round and smooth square at the end that is let into the sides of the shaft at right angles with an elevation of thirty degrees, each spindle or axle to be about three fourths of an inch in diameter and seven inches and a half long clear of the shaft — the spindles are squared at the ends and let into the lower end of the shaft, and made to meet together in the centre of the shaft, above the spindles about an inch or further. A Burr is let into the centre of the shaft, & a screw with a head an inch square is passed through at the joining of the spindles and screwed into the burr, and screwed fast against the spindles to keep them fast, around the end of the shaft below the spindles a small iron ring or band is placed for further securing the shaft from splitting, In the middle or any other convenient part of the shaft is slipped on the shaft a sheet iron box of about the capacity of a gallon measure that a weight may be placed in when found necessary, The shaft may be made eight square from the lower edge of the box to the lower end if thought proper, On the spindly or axles are placed four rollers of a conical form of equal size five and a half inches in length the inner end three inches in diameter, and the outer end eight inches in diameter, the holes in the Rollers to be made through the centre and of sufficient size that they may turn freely on the spindles These rollers may be made of solid wood or metal, they may be made round or eight or sixteen sides, In the lower end of the shaft at one of the sides between any two of the rollers, a piece of Iron or hickery wood is fastened by means of a hole in the shaft to lay horizontal to the shaft, the edge of this iron or piece of wood is elevated for the purpose of leveling down the flour, when the machine is in operation, On the upper end of the shaft is a block with a pulley in it fastened to the shaft, by a swivel to this block is attached a small rope which is turned over a nother block and pulleys attached to the upper floor or joist of the mill, when the rope is placed through the pullies a small weight is attached to the rope, that it may slide freely along the rope, the other end of the rope is fastened to some con venient place and while the cask is filling with flour the Machine is rising in the barrel the weight on the rope keeps it tight that it may not entangle with the machinery, when the barrel is full the rope is hooked on to the pin which keeps up the machine while the barrel is removing and another is put in its place, Between the block and the swivel a wooden pin passes through into a mortice cut in an upright plank, or strong board placed on the frame of the machinery and fastened to the joist or floor above to keep the block and rope from turning while the machine is in operation, This machine is put in motion in the following manner; a small cog wheel from eighteen inches to two feet in diameter is placed in a frame attached the joists of the floor above at a convenient highth to give room
the barrel to be removed from under the machine, through this
g wheel a shaft passes of six inches long or longer if found neces
ary, through this shaft is a square hole sufficiently large to receive
the shaft of the machine that it may pass through freely a connec
ting cog wheel with the one above mentioned and the other
achinery of the Mill is made that it can be put into gear by
eans of a lever which raises the connecting cog wheel, the lever is
kept to its place by means of a pin which it is passed under, there
s a tap or pin placed in the shaft of the machine at a convenient
lace which can be raised or lowered by working in a mortice,
hen the barrel or cask is full of flour, this tap or pin comes
in contact with the lever which moves it out of place and the
onnecting cog wheel falls and the machine stops its motion.
The flour is conveyed into the barrels by means of a spout
from the meal chest at the upper end of the spout a board or
slide is placed, a strap is fastened from the slide to the lever
and when the machine is put in motion the lever draws the
slide that the flour may pass down the spout into the barrel
and when the operation of the machine ceases the slide by means
of a spring pressing against it falls back and turns the
flour into a box for the purpose to receive the flour, this
flour can be shovelled into the barrel while it is filling or
it may be put into the barrel to give it weight if wanted.
This machine may be put in motion by giving motion to the
barrel, the barrel being placed on a pulley the size of the
bottom of the barrel which may be connected with the ma
chinery of the Mill as before mentioned, the upright shaft
of the machine passing through a mortice in a plank above
to keep it steady the motion of the barrel giving motion to
the rollers the machine or barrel as the case may be is to
revolve from twelve to fifteen times a minute.
What I claim as my own invention and not previously known is the machine for packing flour as described unconnected with the machinery for putting it in motion as that will have to vary according to the situation of the machinery of the mills in which it is placed. The advantage resulting from the use of this machine over the old method of shovelling the flour into the barrel from the meal chest packing with the shovel while filling rolling it to the press which frequently requires two persons to press it sufficiently together with the waste of flour which is considerable in mills where much business is done will be very considerable Witness my hand the thirty first day of January A.D. one thousand eight hundred and thirty five (Witnesses
James Madden }
James Rezeros }

John Kinman (1296 words)

(Granted 2nd March 1835)